United States Patent [19]

Robinson et al.

[11] 4,382,017

[45] May 3, 1983

[54] MEANS AND METHOD FOR PROVIDING A NON-FREEZING CATALYST SOLUTION

[76] Inventors: Charles A. Robinson; Barnett J. Robinson, both of 501 Boylston St., Brookline, Mass. 02146

[21] Appl. No.: 182,979

[22] Filed: Sep. 2, 1980

[51] Int. Cl.³ .................... B01J 37/04; B01J 31/28; F02B 75/12; C10L 1/02
[52] U.S. Cl. .................................. 252/429 R; 44/53; 44/68; 123/1 A; 431/4
[58] Field of Search .................... 252/429 R, 441, 74; 123/1 A; 431/4; 44/53, 68

[56] References Cited

U.S. PATENT DOCUMENTS

| | | | |
|---|---|---|---|
| 2,460,700 | 2/1949 | Lyons | 123/1 A |
| 3,119,875 | 1/1964 | Steinmetz | 252/429 R |
| 3,410,807 | 11/1968 | Lloyd | 252/429 R |
| 4,118,339 | 10/1978 | Latos | 252/414 |

FOREIGN PATENT DOCUMENTS

| | | | |
|---|---|---|---|
| 2001291 | 7/1971 | Fed. Rep. of Germany | 252/441 |
| 1146530 | 3/1969 | United Kingdom | 75/0.5 A |

Primary Examiner—P. E. Konopka
Attorney, Agent, or Firm—David M. Warren

[57] ABSTRACT

A non-freezing catalyst solution carries a platinum group metal compound admixed with an antifreeze compound which is blocked from reaction therewith by a blocking agent. The blocking agent is selected from the group consisting of hydrogen chloride and lithium chloride. All of the materials are soluble in solution at room temperature.

2 Claims, No Drawings

MEANS AND METHOD FOR PROVIDING A NON-FREEZING CATALYST SOLUTION

BACKGROUND OF THE INVENTION

A number of catalyst preparations have been suggested for use to improve fossil fuel combustion in both automotive engines and oil-fired heating systems and furnaces. Such catalysts have been indicated to increase fuel efficiency when directly injected into the combustion chamber. U.S. Pat. No. 2,460,700 to Lyons dated Feb. 1, 1949 suggests the use of a number of catalytic metal compounds which can be dissolved or dispersed in an internal coolant liquid and then introduced into a combustion chamber. In an improvement of the Lyons teaching, certain platinum group metal catalysts are disclosed in a particular system in copending U.S. application Ser. No. 163,865 filed June 27, 1980 U.S. Pat. No. 4,295,816, entitled Catalyst Delivery System.

Prior art catalyst solutions particularly when used for automotive engines are subject to freezing problems in certain environments. For example, when water solutions are used, the solutions tend to freeze at 0° F. or lower freezing temperatures often encountered in standard environmental conditions. There has been some difficulty in preventing such freezing. Lyons does mention the use of certain alcohols or glycols in catalyst solutions. However, it has been found that when alcohols or glycols are added to platinum group metal compounds, a reaction often occurs which renders the solutions unsuitable for use in catalyzing internal combustion engine and furnace processes. Such reaction between alcohols and/or glycols and the platinum group metal compound is highly undesirable and can prevent use of systems in freezing environmental conditions.

SUMMARY OF THE INVENTION

It is an object of this invention to provide a means and method for preventing freezing at ambient conditions of a group platinum metal containing compound containing solution for use in catalyzing fossil fuel combustion.

Still another object of this invention is to provide a solution which carries a group platinum metal compound useful in catalyzing fossil fuel combustion and further carries an antifreeze material along with a blocking material for preventing unwanted reaction between the antifreeze and the platinum group metal compound.

Still another object of this invention is to provide a solution in accordance with the preceding object where the blocking agent is a chloride.

According to the invention a catalyst solution for use in increasing efficiency of fossil fuel combustion comprises a group platinum metal halide and an antifreeze compound selected from the group consisting of alcohols and glycols in sufficient concentration to provide antifreeze properties. A blocking agent is added to the metal compound and antifreeze compound to prevent unwanted reaction between the two.

Preferably the alcohol or glycol is used in an amount of from 20 to 80% and preferably 50% of the solution in order to provide antifreezing properties to at least 0° F. and preferably 32° F.

It is a feature of this invention that the solution can be an aqueous solution yet still will not freeze at normally encountered environmental conditions. Thus when the solution is used in an automobile left under ambient conditions, the catalyst will be available for use in all normal conditions. The amount of catalyst in solution can vary greatly. It is preferred that the solution be admixed with no more than 9 parts per million of the fuel used in the combustion area. The antifreeze material and blocking agent added to the solution, still permit concentrations such as to deliver easily a solution for admixture with fuel where the group platinum metal can be at a concentration below 9 parts per million.

DESCRIPTION OF PREFERRED EMBODIMENTS

The group platinum metals which are useful as catalysts in the present invention include platinum, rhodium, palladium, osmium, ruthenium and iridium.

These metals are preferably in halide form and may be in the form of halides of chlorine, bromine, iodine. Preferably the platinum group metal compounds include any of the halides of the above metals. The preferred materials for use as catalysts in automotive engines are chlorides and preferably dihydrogen platinum hexachloride $H_2PtCl_6.6H_2O$. Other group platinum metal compounds particularly useful in this invention include the following:

$Pt(CO)Cl_2$
$RhCl_3$
$RhCl_3.3H_2O$

The platinum group metal halide compounds are preferably soluble in water and water solutions are preferred for use. The solutions of platinum and rhodium in concentrations of from $2\times10^{-5}$ to $3\times10^{-4}$ grams of metal to grams of total solution, palladium $3\times10^{-3}$ to $2\times10^{-4}$ grams of metal to grams of total solution and osmium ruthenium and iridium $2\times10^{-3}$ to $2.7\times10^{-2}$ grams of metal to grams of total solution are preferred although the concentration of the metals can vary greatly in the total solution comprising antifreeze water and blocking agent.

The group platinum metal halides are preferably in water solutions where the water comprises at least 2% and preferably 50% by volume of the total solution.

The antifreeze compound useful is preferably any of the known antifreeze compounds such as glycols and alcohols. Preferably the alcohols and glycols are water soluble as are the halides used. Monohydric alcohol such as methyl, ethyl or isopropyl alcohol are preferred. Glycols preferred for use include ethylene glycol and propylene glycol. In most cases, ethylene glycol is used since it does not interfere with the catalyst action in any way in the same manner that the other alcohols and glycols do not so interfere and also provides excellent antifreeze properties for a prolonged period of time. Moreover, glycols are not flammable in the conditions of use normally encountered.

Normally if one just used an alcohol or glycol in conjunction with the platinum group metal halides, there would be a severe interaction which could cause precipitation and destruction of the solution in terms of usefulness as a catalyst for fossil fuel combustion in normal furnaces and engines. Thus, a blocking agent must be used.

The alcohol or glycol is preferably used in amounts of from 20 to 80% by volume of the overall solution with 50% being preferred when glycols are used in order to get maximum antifreeze properties. As little as 35% ethylene glycol can provide sufficient freezing protection in most climates.

Blocking agents useful in the present invention are preferably chlorides which act to prevent the interaction of the alcohol or glycol with the platinum group metal compound used. Preferred chlorides are sodium chloride, lithium chloride, hydrochloric acid or mixtures thereof. When hydrochloric acid is used, it is preferably concentrated hydrochloric acid. Preferably the hydrochloric acid is used in an amount of from at least 0.5% by weight of the glycol or alcohol. Greater amounts can be used although there is not much use to using more than 10%. Similarly, when lithium chloride or sodium chloride are used, they are used in an amount of at least 0.5% by weight of the glycol or alcohol although concentrations of from 6% by weight to 40% by weight or higher of the glycol or alcohol are preferred. Lithium chloride is preferred for use since it does not lower the pH of the overall solution significantly.

Preferably the hydrochloric acid, sodium chloride, or lithium chloride or mixtures of the two is added to the glycol or alcohol prior to admixture of the glycol or alcohol with the platinum group metal compound. Thus the glycol or alcohol is blocked from reaction prior to admixture. In some cases, the additive blocking agent can be added to the platinum group metal compound rather than to the glycol but it must be added before there is a chance for the two reaction components to enter into a reaction.

While the exact mechanism of the reaction is not fully understood, it is believed that there is an equilibrium established when the platinum group metal halide compound reacts with water in any solution tending to break down the compound. When chloride ions are added, as is the effect of adding hydrochloric acid, lithium chloride or sodium chloride, the equilibrium is shifted to maintain the platinum group metal halide originally used in its original form preventing breakdown.

In a specific example of the invention, 40 grams of $H_2PtCl_6.6H_2O$ (chloroplatinic acid) is added to a mixture of 425 grams of lithium chloride admixed with 3600 grams of ethylene glycol and 15,000 grams of water to obtain an admixture having a volume of about 5 gallons. Note that the lithium chloride is added to the ethylene glycol and water prior to admixture with the chloroplatinic acid. Of course the chloroplatinic acid could be dissolved in water first and/or admixed with the lithium chloride first before admixture with ethylene glycol. The above mixture yields a 5 gallon stock solution. That solution is best diluted and admixed further by taking 1400 grams of the mixture, adding 5000 grams of ethylene glycol, 570 grams of lithium chloride and an additional 11,500 grams of water to obtain a usable catalyst solution for use in an automobile engine.

The catalyst solution is entrained in an air mixture as by addition to the carburetor of an automobile and further admixture with a fuel such as gasoline at a concentration preferably no higher than 9 ppm of the fuel gas mixture.

The mechanism for entraining the solution to carry the catalyst into a combustion area can vary greatly. U.S. patent application Ser. No. 163,865 of the present inventor previously identified discloses one particularly useful method although other methods may also be used.

While a specific embodiment of the present invention has been shown and described, many variations are possible. In all cases a blocking agent is used to prevent the reaction of an antifreeze material with a platinum group metal halide to act as a stabilizer for the solution and enable it to be stored at freezing conditions of the solution which is preferably an aqueous solution.

The specific amounts of materials can vary greatly. The important point of the invention relates to the use of the blocking agent which is preferably a chloride and which blocks the reaction of the glycol or alcohol with the platinum group metal halide. Exact amounts can vary greatly with more or less blocking action encountered. The fossil fuel to be catalyzed can be any fossil fuel preferably in fluid form and more preferably in gaseous form as in the gaseous mixture in an automobile cylinder. The solution of the present invention is preferably a water solution which is subjected to freezing but for the additives of the present invention.

What is claimed is:

1. A method of preventing unwanted precipitation of a stable aqueous catalyst solution comprising an admixture of a water soluble compound of platinum and chlorine in a catalytic amount, and an antifreeze compound selected from the group consisting of alcohol and glycols and mixtures thereof, said method comprising adding a chloride selected from the group consisting of hydrochloric acid, lithium chloride, sodium chloride and mixtures thereof to said compound of platinum or to said antifreeze compound prior to admixing said antifreeze compound and said platinum compound, and following said admixing, adding water to provide approximately 50% water by volume.

2. A method according to claim 1 wherein said compound of platinum and chlorine is $H_2PtCl_6.6H_2O$, said antifreeze compound is ethylene glycol, and wherein said chloride is lithium chloride.

* * * * *